United States Patent [19]

Tano et al.

[11] Patent Number: 4,723,697

[45] Date of Patent: Feb. 9, 1988

[54] TRACTOR FEEDER FOR PRINTER

[75] Inventors: Osamu Tano; Hiroshi Okamoto, both of Kanagawa, Japan

[73] Assignee: NHK Spring Co., Ltd., Yokohama, Japan

[21] Appl. No.: 896,263

[22] Filed: Aug. 14, 1986

[30] Foreign Application Priority Data

Dec. 23, 1985 [JP] Japan ................................ 60-291079

[51] Int. Cl.[4] ................................................ G03B 1/22

[52] U.S. Cl. ...................................................... 226/74

[58] Field of Search ..................... 226/74, 75; 400/616, 400/616.1, 616.2

[56] References Cited

U.S. PATENT DOCUMENTS

| | | | |
|---|---|---|---|
| 3,825,162 | 7/1974 | Hubbard | 226/74 |
| 3,930,601 | 1/1976 | Masuda | 226/74 |
| 4,129,239 | 12/1978 | Hubbard | 226/75 |
| 4,428,519 | 1/1984 | Reichl et al. | 226/75 |
| 4,453,660 | 6/1984 | Cornell et al. | 226/74 |
| 4,457,463 | 7/1984 | Hubbard et al. | 226/74 |
| 4,469,264 | 9/1984 | Suzuki et al. | 226/74 |

*Primary Examiner*—Stuart S. Levy
*Assistant Examiner*—Lynn M. Sohacki
*Attorney, Agent, or Firm*—Jeffers, Hoffman & Niewyk

[57] ABSTRACT

A tractor feeder for feeding continuous printing paper having perforations along its side fringes by driving pins engaged to the perforations. The pins are formed on the outer surface of an endless belt which is passed around a drive sprocket on one hand and a guide member on the other hand. The guide member is adjustable by an adjusting member such as an eccentric cam so as to apply a desired tension to the endless belt. The guide member may be provided with a roller rotatively supported by the guide member or a pair of rollers rotatively supported by the frame so as to minimize the friction to the traveling motion of the endless belt. These pulleys may be provided with flanges so that friction between the side edges of the endless belt and the guide member may be minimized.

4 Claims, 7 Drawing Figures

TRACTOR FEEDER FOR PRINTER

TECHNICAL BACKGROUND

The present invention relates to a tractor feeder for feeding continuous printing paper by driving paper feed pins which are engaged to paper feeding holes provided along both the side fringes of the continuous printing paper.

Continuous printing paper for use in a printer, for instance serving as an output device for a computer, is generally provided with paper feeding holes or perforations at equal intervals along the fringes on either side of the printing paper. A tractor feeder having an endless belt provided with a plurality of pins projecting therefrom is known as one of the paper feeding devices for use in printers which employ such continuous printing paper. According to a tractor feeder of this type, the endless belt is stretched between a drive sprocket and a guide portion of the frame provided opposite to the drive sprocket so that the belt may be driven by the drive sprocket.

To achieve proper paper feeding action, the motion of the belt must be proper. Therefore, the frame of a tractor feeder generally defines guide grooves at its upper and lower surfaces for the purpose of prohibiting the vertical and lateral deviation of the belt from its prescribed path, and the guide portion provided opposite to the drive sprocket is provided with a guide member which forms a semi-circular path in continuation from the guide grooves and is normally integral with the frame.

If there is any excessive slack in the endless belt, the engagement between the sprocket and the endless belt may not be assured. If the tension of the endless belt is excessive, the frictional resistance between the various moving parts of the tractor feeder and between the endless belt and the tractor feeder may increase and the durability of the system may be impaired.

U.S. Pat. Nos. 3,825,162 and 4,129,239 show tractor feeders which have freely rotatable but otherwise fixed guide members. If the position of the guide member is fixed, the tension of the endless belt is strongly affected by the deviation of the circumferential length of the endless belt from a certain standard length and exact tolerance control for the endless belt is necessary for accurate control of the tension of the endless belt.

U.S. Pat. No. 4,457,463 discloses a D-shaped shoe which is biased by a spring member towards the endless belt and applies a certain tension to the endless belt. U.S. Pat. No. 4,469,263 discloses spring biasing members which, integrally provided with spring leg portions and placed on the bottom surfaces of the grooves defining straight paths for the endless belt, bias the endless belt and apply certain tension thereto. According to this technique of using a spring member for applying tension to the endless belt, since the endless belt is always under a certain tension which is required to take away the slack from the endless belt, the frictional resistance which the endless belt receives from the tractor feeder can not be reduced to a very low level.

U.S. Pat. No. 3,930,601 discloses a tractor feeder having an idler molding having bifurcated legs. According to this tractor feeder, a pair of bolts are passed through elongated holes provided in the frame and the holes in the idler molding so that the idler molding may be fixed by fastening this bolt after adjusting the position of the idler molding. Thus, the endless belt may be put free from slack and no substantial residual tension will be produced in the endless belt, but the adjustment is not simple since the bolts must be fastened while the idler molding is securely held in a desired position for instance by hand.

BRIEF SUMMARY OF THE INVENTION

In view of such problems of the prior art, a primary object of the present invention is to provide a tractor feeder for printer which is provided with a tension adjusting mechanism for applying appropriate tension to the endless belt for optimum pin feed action.

Another object of the present invention is to provide a tractor feeder for printer which is provided with a tension adjusting mechanism which can be easily and accurately adjusted.

Yet another object of the present invention is to provide a tractor feeder for printer which can reduce the frictional resistance to the traveling motion of the belt and improve the durability of the endless belt and other parts of the tractor feeder.

According to the present invention, such an object is accomplished by providing a tractor feeder for feeding continuous printing paper, comprising a frame, a drive sprocket rotatively supported by the frame, an endless belt which is wound onto the drive sprocket and provided with paper feeding means thereon, and guide means defining a path for the belt, wherein: the guide means comprises a pair of guide plates defining a pair of guide grooves on either one of the upper and lower surfaces of the frame, a block which is slidably held between the guide plates defining an arcuate guide surface for the endless belt, and cam means which cooperates with an end surface of the block for positional adjustment of the block.

Thus, by providing cam means for adjusting the position of the block defining the arcuate guide surface, the tension of the endless belt can be optimized and the resistance to the traveling motion of the belt can be substantially reduced without having any slack in the endless belt.

According to a certain aspect of the present invention, the cam means comprises an eccentric cam which is rotatively supported by the frame and engages with the end surface of the block. Thereby, the adjustment of the position of the block is facilitated and the slack of the belt can be readily removed without causing any excessive tension in the belt.

According to another aspect of the present invention, the guide surface is defined by a guide pulley which is rotatively supported by the block. Alternatively, the arcuate guide surface is defined by a free end of the block, and a pair of guide pulleys are rotatively supported by the frame and are received in a pair of depressions provided on either side of the free end of the block adjacent to the path of the endless belt. Thus, in either case, the belt is supported by a rotatable member or rotatable members at the end of the frame opposite to the drive sprocket, and the frictional resistance to the motion of the belt can be reduced.

According to yet another aspect of the present invention, the pulleys are provided with flanges on either sides thereof. Thereby, the lateral deviation of the motion of the endless belt can be controlled without substantially increasing the frictional resistance to the endless belt.

According to yet another aspect of the present, the guide block is provided with an elongated lateral hole for receiving a lateral shaft therethrough so that the tractor feeder may be moved laterally along the lateral shaft so as to accommodate printing paper of desired width or to position the printing paper relative to a print head. Thereby, there is no wasteful space within the frame and the size of the tractor feeder can be minimized.

BRIEF DESCRIPTION OF THE DRAWINGS

The present invention will now be shown and described in the following in terms of concrete embodiments thereof with reference to the appended drawings, in which.

DETAILED DESCRIPTION OF THE EMBODIMENTS

Now the preferred embodiments of the present invention are described in the following with reference to the appended drawings.

Figure 1:
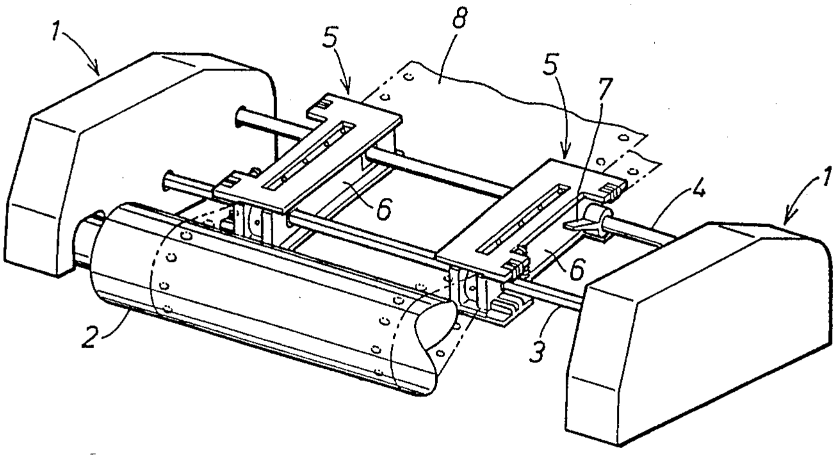
FIG. 1 is a simplified perspective view of a paper feed device according to the present invention.

FIG. 1 is a partially simplified perspective view showing a paper feed device according to the present invention. A columnar platen 2, a drive shaft 3 and a lateral shaft 4 are bridged across a pair of frame members 1 which are provided on either side end of a printer. A pair of tractor feeders 5 are fitted over the drive shaft 3 and then lateral shaft 4 in an axially moveable manner. Continuous printing paper 8, which is held onto the upper and lower surfaces of the tractor feeders 5, is passed through the undersurfaces of the tractor feeders 5 and the, after being passed under the platen 2 and along the front surface of the platen 2, passed from the upper side of the platen 2 to the upper surfaces of the tractor feeders 5.

Figure 3:
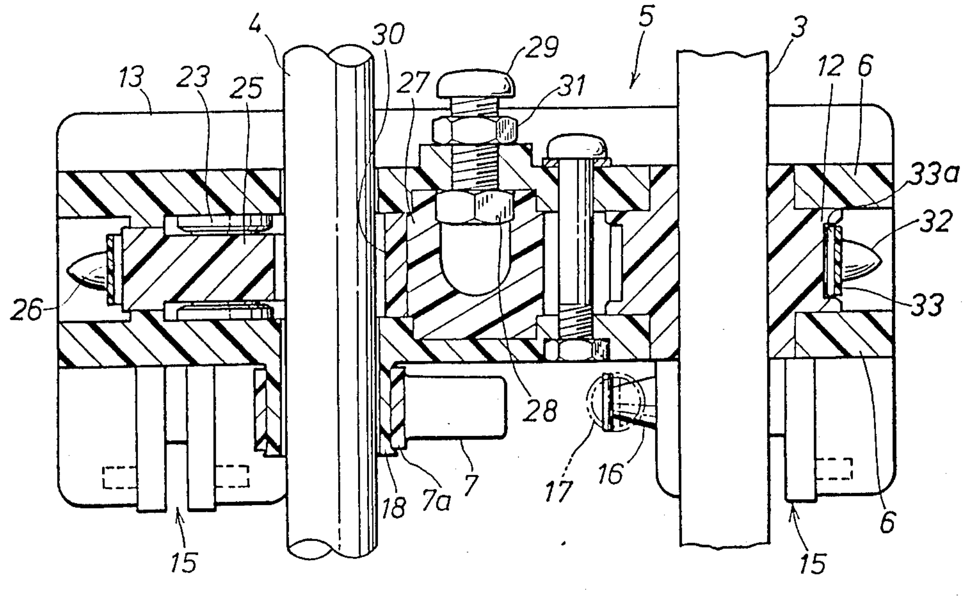
FIG. 3 is a sectional view taken along line III—III of FIG. 2.

As best shown in FIG. 3, an annular collar *7a* provided in a base end of a lever 7 is fitted coaxially onto an annular boss 18 which is integrally provided in the frame 6 which forms a side surface of the tractor feeder 5 and receives therethrough the lateral shaft 4, so that the tractor feeder 5 can be secured with securing means which is provided in the base end portion of the lever 7 and described hereinafter in greater detail, by acting upon the lever 7 after laterally moving the tractor feeder 5 to a position corresponding to the lateral width of the continuous printing paper 8.

Figure 2:
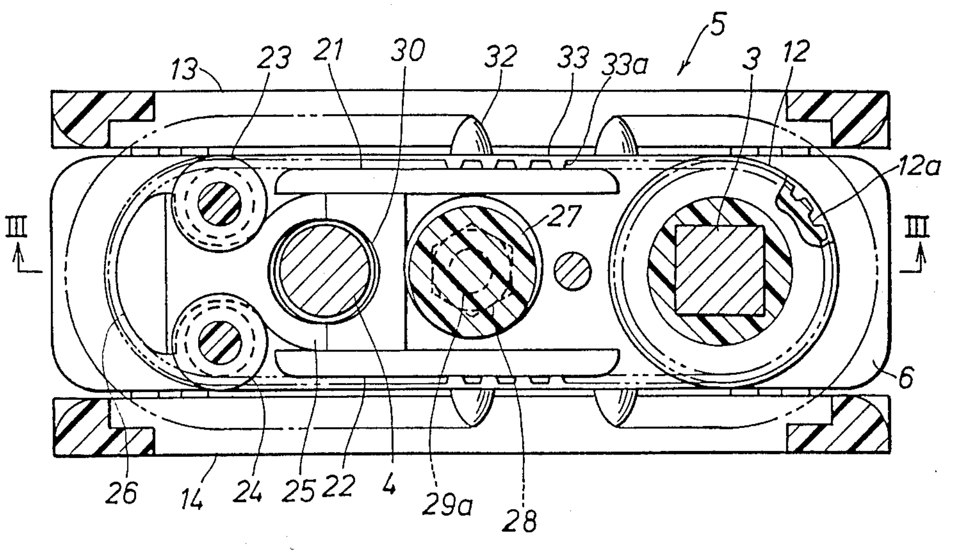
FIG. 2 is a partially broken away side view of a first embodiment of the present invention.

As shown in FIGS. 2 and 3, according to this tractor feeder 5, the drive shaft 3 is passed through a drive sprocket 12 which is rotatably supported by the frame 6. With the lateral shaft 4 likewise passed through the frame 6, the tractor feeder 5 is supported by these shafts in a freely slidable manner along the axial direction. Whereas cross section of the lateral shaft 4 is circular the cross section of the drive shaft 3 is rectangular, so that the sprocket 12 can be driven by turning the drive shaft 3, and both the lateral shaft 4 and the drive shaft 3 guide the lateral motion of the tractor feeders 5.

The frame 6 is integrally provided with the substantially tubular extension 18 which receives the lateral shaft 4 in an coaxial manner as mentioned earlier and is provided with slits at its diagonal positions although they are not shown in the drawings. The outer circumferential surface of the extension 18 is provided with a tapering surface along the circumferential direction thereof, and the annular collar *7a* at the base end of the lever 7, which is likewise provided with a tapering surface which fits over the tapering surface of the extension 18 along its inner circumferential surface, is fitted over the outer circumferential surface of the extension 18. Thus, according to the securing means of this structure, by acting upon the lever 7 and rotating the annual collar *7a* of the base end of the lever 7 to push down the outer circumferential surface of the extension 18 through mutual cooperation of the tapering surfaces of the extension 18 and the annular collar *7a* on the base end of the lever 7, the extension 18 constricts upon the lateral shaft 4 and the tractor feeder 5 can be fixed at any desired position.

The frame 6 carries a pair of holding plates 13 and 14 covering the upper and the lower surface of the frame 6, respectively, each by way of a pair of hinges 15. The base ends of the holding plates 13 and 14 are each provided with an engagement piece 16 in a mutually parallel manner and a coil spring 17 engaged between these engagement pieces 16 biases the holding plates 13 and 14 against the upper and lower surfaces of the frame 6.

Figure 4:
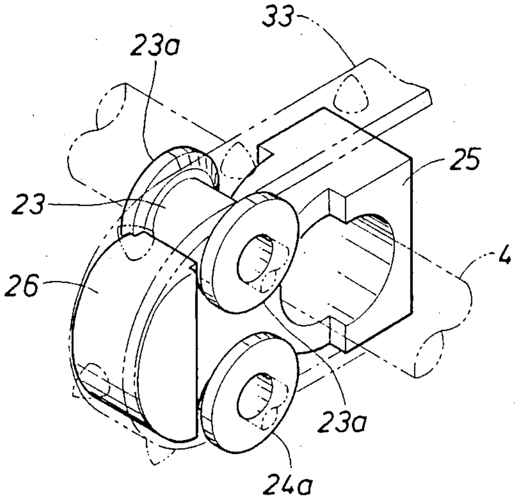
FIG. 4 is a perspective view of an essential portion of the first embodiment.

The central part of the frame 6 is provided with a pair of guide plates 21 and 22, facing the upper surface and the lower surface thereof, respectively, in a mutually parallel manner. These guide plates 21 and 22 may be provided either by the projections extending from one side of the frame 6 or by the projections extending from both sides of the frame 6. The end of the frame 6 opposite to the drive sprocket 12 is provided with a pair of pulleys 23 and 24 which are flanged on their either ends as denoted by numerals **23*a* and 24*a* in FIG. 4 and rotatively supported by the frame 6 on the upper and lower surfaces of the frame 6, respectively, as best shown in FIG. 4. The outer most end of this end of the guide block 25 is provided with an arcuate guide surface 26 which is provided on a free end of a guide block 25** which is described hereinafter.

The base end of the guide block 25 is slidably received between the reverse surfaces of the guide plates 21 and 22, and a central portion of the base end of the guide block 25 is provided with an elongated hole 30 which defines certain gaps relative to the lateral shaft 4 passed through this hole 30. The neck portion of the guide block 25 is depressed so as not to interfere with the portions rotatively supporting the pulleys 23 and 24. An eccentric cam 27 which is rotatively supported by the frame 6 engages with the end surface of the base end of the guide block 25. A nut 28 is coaxially embedded in the eccentric cam 27, and a free end of a screw 29 having a head protruding outside the frame 6 is fixedly secured to this nut 28. The shank portion of the screw protruding outside the frame 6 is engaged to a lock nut 31.

A belt 33 provided with pins 32 projecting therefrom for engagement with the paper feed holes of the continuous printing paper 8 is passed around the drive sprocket 12, along the guide plates 21 and 22, and around the pulleys 23 and 24 and the guide surface 26 of the guide block 25. The reverse surface of the belt 33 is provided with teeth 33*a* at equal intervals along its circumferential direction so that the torque of the drive sprocket 12 may be transmitted to the belt 33 by the engagement of the teeth 33*a* with grooves 12*a* provided on the outer circumferential surface of the drive sprocket 12 so as to correspond to the teeth 33*a*.

In operation, by turning the head 29*a* of the screw 29, which is fixedly secured to the eccentric cam 27, with a suitable tool, a desired tension can be applied to the belt 33 by pushing the guide block 25 outwards according to the eccentricity of the eccentric cam 27. By fastening the lock nut 31 which is threaded with the screw 29, the eccentric cam 27 may be fixed at any desired portion.

The guide plates 21 and 22 and the guide surface 26 are not provided with any lateral flanges but the lateral motion of the belt 33 can be sufficiently restricted by the flanges provided in the drive sprocket 12 and the pulleys 23*a* and 24*a*.

Figure 7:
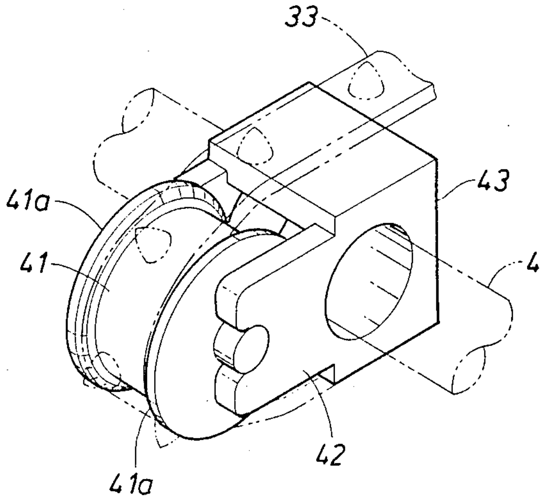
FIG. 7 is a perspective view of an essential portion of the second embodiment.
Figure 5:
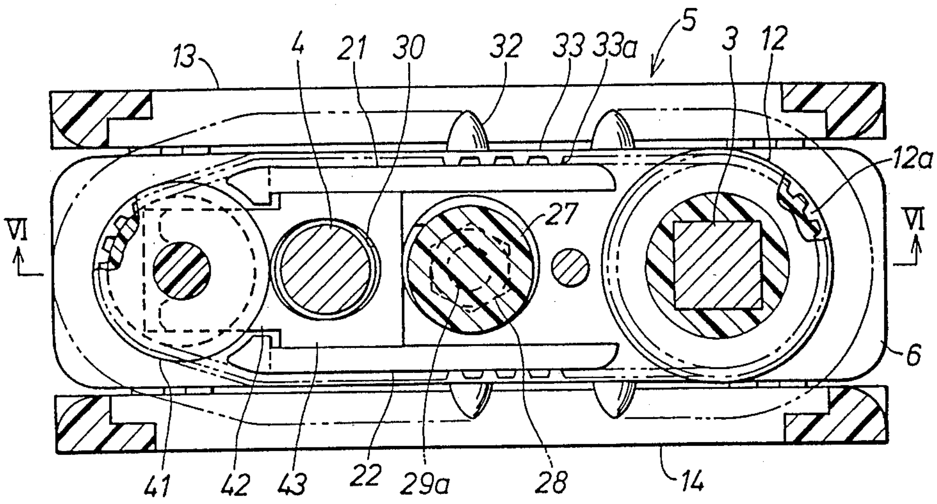
FIG. 5 is a partially broken away side view of a modified embodiment of the present invention.
Figure 6:
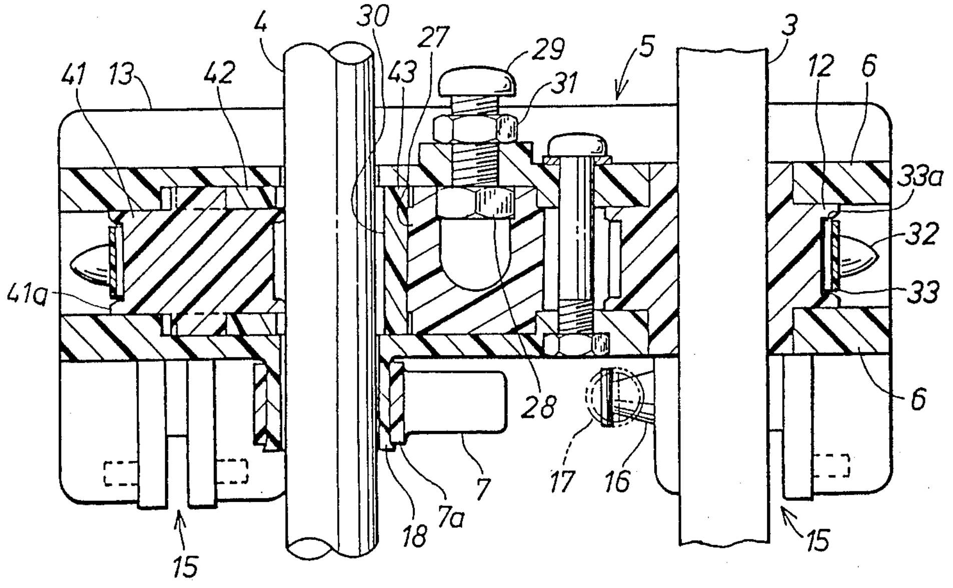
FIG. 6 is a sectional view taken along line VI—VI of FIG. 5.

FIGS. 5, 6 and 7 show another embodiment of the present invention and according to this embodiment the part of the frame 6 opposite to the drive sprocket 12 is provided with a pulley 41 having flanges 41*a* on its either side end, and this pulley 41 is rotatively supported by a bearing bracket 42 which is integrally formed with a pulley bracket 43 which is slidably received between the guide plates 21 and 22 in a manner similar to the guide block 25 of the first embodiment. An elongated hole 30 is defined in the pulley bracket 43 for loosely accommodating the lateral shaft 4 therethrough.

According to this modified embodiment also, the side surface of the base end of the pulley bracket 43 is in contact with the eccentric cam 27 and a desired tension can be applied to the belt 33 by way of the pulley 41 by turning the screw 29 in the same way as in the first embodiment.

Thus, according to the present invention, the drive force of the drive sprocket can be positively transmitted to the belt by applying appropriate tension to the belt. Furthermore, by restricting the lateral motion of the belt only with pulleys having flanges, the contact area between the belt and the guide means can be minimized and the resistance to the traveling motion of the belt can be reduced with the result that the durability of the belt and the drive system can be improved.

Although the present invention has been shown and described with reference to the preferred embodiments thereof, it would not be considered as limited thereby. Various possible modifications and alterations could be conceived of by one skilled in the art to any particular embodiment, without departing from the scope of the invention.

What we claim is:

1. Tractor feeder for feeding continuous printing paper, comprising a frame, a drive sprocket rotatively supported by the frame, an endless belt which is wound onto the drive sprocket and provided with paper feeding means thereon, and guide means defining a path for the belt, wherein:

the guide means comprises a pair of guide plates defining a pair of guide grooves on either one of the upper and lower surfaces of the frame, a guide block which is slidably held between the guide plates defining an arcuate guide surface at a free end thereof for the endless belt, a pair of guide pulleys which are rotatably supported by the frame and are received in a pair of depressions provided on either side of the free end of the guide block adjacent to the path of the endless belt and cam means which cooperates with an end surface of the guide block for positional adjustment of the guide block.

2. Tractor feeder for feeding continuous printing paper as defined in claim 1, wherein the cam means comprises an eccentric cam which is rotatively supported by the frame and engages with the end surface of the guide block.

3. Tractor feeder for feeding continuous printing paper as defined in claim 2, wherein the guide pulleys are provided with flanges on either sides thereof.

4. Tractor feeder for feeding continuous printing paper as defined in claim 3, wherein the guide block is provided with an elongated lateral hole for receiving a lateral shaft therethrough so that the tractor feeder may be moved laterally along the lateral shaft so as to accommodate printing paper of desired width or to adjustably position the printing paper relative to a print head.

* * * * *